Dec. 15, 1970     L. J. McARTHUR     3,548,263
FLIP FLOP CIRCUIT

Filed Jan. 25, 1968                              3 Sheets-Sheet 1

*INVENTOR*
LESTER J. McARTHUR

BY Woodard, Weikart, Emhardt & Naughton
*Attorneys*

Dec. 15, 1970     L. J. McARTHUR     3,548,263
FLIP FLOP CIRCUIT

Filed Jan. 25, 1968     3 Sheets-Sheet 2

INVENTOR.
LESTER J. McARTHUR

BY Woodard, Weikart, Emhardt & Naughton
Attorneys

Dec. 15, 1970  L. J. McARTHUR  3,548,263
FLIP FLOP CIRCUIT
Filed Jan. 25, 1968  3 Sheets-Sheet 3

INVENTOR
LESTER J. McARTHUR

United States Patent Office 3,548,263
Patented Dec. 15, 1970

3,548,263
FLIP FLOP CIRCUIT
Lester J. McArthur, Wabash, Ind., assignor to Wabash Magnetics, Inc., Wabash, Ind., a corporation of Indiana
Filed Jan. 25, 1968, Ser. No. 700,565
Int. Cl. H01h 47/32
U.S. Cl. 317—148.5
4 Claims

ABSTRACT OF THE DISCLOSURE

A control module and flip flop circuit including a relay having a coil which is held operated through a latch circuit including a silicon controlled rectifier. The gate of the silicon controlled rectifier is connected to a set input and the cathode of the silicon controlled rectifier is connected to a reset input through blocking diodes.

BACKGROUND OF THE INVENTION

Field of the invention

This invention relates to electric circuits for relays and electromagnets and more particularly to pulse responsive relays for information storage and sequential operation.

Description of the prior art

Many circuits for providing relay logic and memory functions have been devised and are known in the art. Some of them for example, those shown in Werst 3,042,-900 and Tevonian 3,088,056 require relay coils having three windings. Others, such as shown by Keller 3,118,090, employ remanent magnetic material and multiple winding coils. Still others, such as described in Jacobson 3,020,369 and Deeg 3,244,942 require a complex physical arrangement of coils, contacts and magnetic shunt material.

Some of the above cited devices find application in special circumstances. The Keller device, for example, may be particularly suited to applications where power consumption must be kept to a minimum, but its cost and complexity tend to make it unsuitable for many general applications. This is generally true of all the devices requiring multiple winding coils, the cost of multiple winding coils being somewhat higher than the cost of single winding coils. Where extremely high speed operation is required, solid state or semiconductor circuits are generally dictated, their operating speeds exceeding that of mechanical contacts by several magnitudes. The solid state circuits, however, are generally not capable of handling power in excess of a few hundred milliwatts, or a few watts at the most. Additionally, the solid state devices generally require rather expensive power supply devices.

There exists a need for a control module and flip flop circuit adaptable to perform a large number of logic and memory functions and which is simple in construction and economical to manufacture. It should provide comparatively high operating speeds and yet be capable of handling comparatively large power, while not requiring the expensive power supply devices necessary for solid state devices.

SUMMARY OF THE INVENTION

One embodiment of the present invention might include a control module comprising: first contact means operable between first and second positions; a winding means providing a magnetic field for operating said first contact means; a controlled rectifier having its cathode connected to said winding means and having a gate and an anode; a latch input circuit connected to the anode of said controlled rectifier for energizing said winding means through said controlled rectifier; a set input circuit connected to the gate of said controlled rectifier for turning on said controlled rectifier; and a reset input circuit connected to said cathode for extinguishing said silicon controlled rectifier.

One object of this invention is to provide an improved control module.

Another object of this invention is to provide an improved flip flop circuit.

Still another object of this invention is to provide a module of simple construction that is economical to manufacture.

Still a further object of this invention is to provide a module having comparatively high operating speeds and which is capable of handling a comparatively large amount of power.

Related objects and advantages wil become apparent as the description proceeds.

BRIEF DESCRIPTION OF THE DRAWING

The full nature of the invention will be understood from the accompanying drawings and the following description and claims:

DESCRIPTION OF THE PREFERRED EMBODIMENTS

Figure 1:
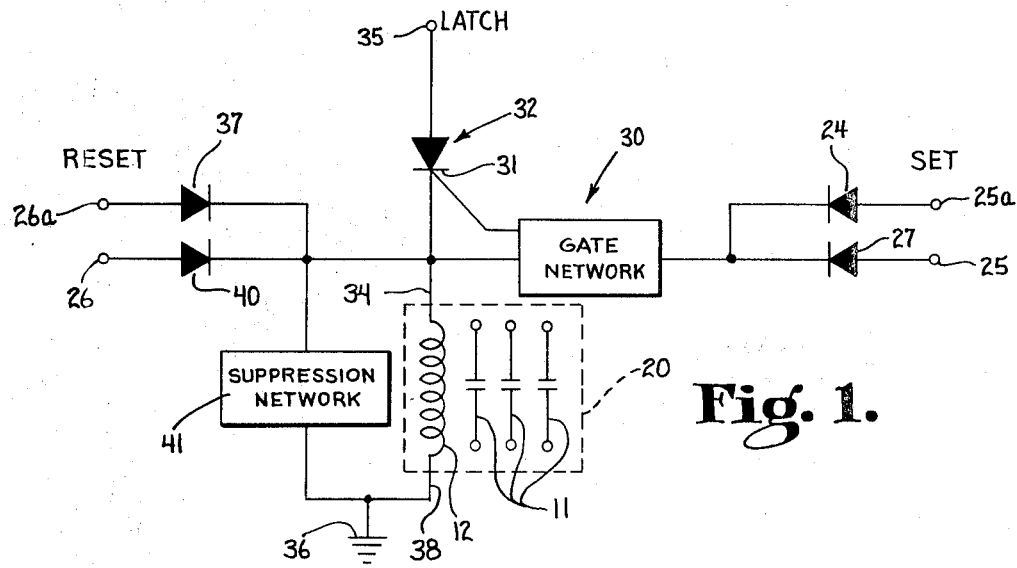
FIG. 1 is a schematic diagram of a circuit embodying the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device. and such furher applications of the principles of the invention as illustrated therein being contemplated as would normally occur to one skilled in the art to which the invention relates.

Figure 9:
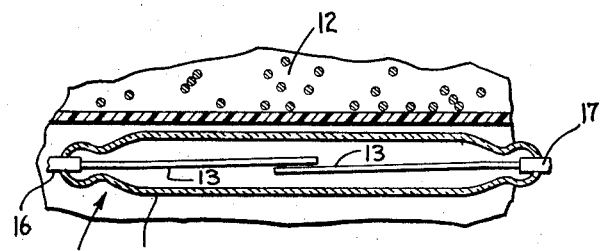
FIG. 9 is an enlarged sectional view of an encapsulated switch forming a part of the structure of FIG. 8.

Referring now more specifically to FIG. 9, there is generally illustrated the type of switch used in the preferred embodiment of the present module. An encapsulated switch 11 is located so that it lies within the influence of a magnetic field created by passing an electrical current through the coil 12. The encapsulated switch may be of any of the well-known "wet" or "dry" contact types. In switch 11 there are two electrically conductive reeds 13 formed of paramagnetic material having a comparatively low residual magnetism. The reeds 13 are sealed in and supported by the nonconductive and nonmagnetic envelope 14, which is generally evacuated. The reeds 13 are normally spaced apart from each other in overlapping relation as shown in FIG. 9.

Figure 8:
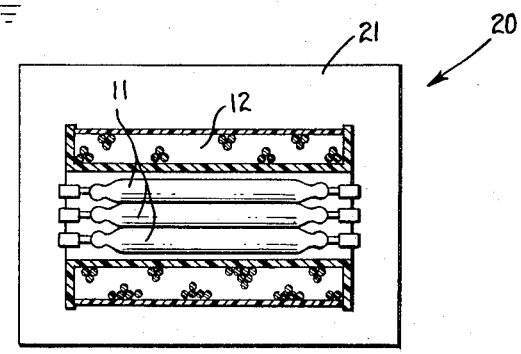
FIG. 8 is a front elevational view partly in section of the module of the present invention.

When the switch 11 is subjected to a magnetic field generally parallel to the reeds 13, such as the field generated by the coil 12, the field tends to be concentrated within the reeds, and induces magnetic poles at the extremities of the reeds 13. In a magnetic field of either polarity, and of a certain magnitude, opposite magnetic poles will be induced in the overlapping ends of the reeds 13 causing them to attract each other and move into engagement, thereby completing the electrical circuit from the terminal 16 to the terminal 17. The control module 20 may easily be mounted on a circuit board 21 as shown in FIG. 8 or any other of a large number of possible physical mountings which are well known in the art.

Referring now more particularly to FIG. 1, the circuit includes set input terminals 25 and 25a which are connected to the one side of the diodes 24 and 27. The other sides of the diodes 24 and 27 are connected together and to a gate network 30. The gate network 30 is connected to the gate 31 of a silicon controlled rectifier 32. The anode of the silicon controlled rectifier 32 is connected to the latch terminal 35 while the cathode of the controlled rectifier 32 is connected to one side 34 of the winding 12 along with the output of the gate network 30. The other side 38 of the winding 12 is connected to ground at 36. The reset terminals are 26 and 26a which are connected to the anode side of the respective diodes 37 and 40. The cathodes of the diodes 37 and 40 are connected to one another and to the one side 34 of the winding 12 as well as to one side of a suppression network 41 the other side of which is connected to ground at 36. It should be mentioned that for simplicity there is a disclosure of three of the switches 11 but that a greater or lesser number can be used in the module 20.

Figure 2:
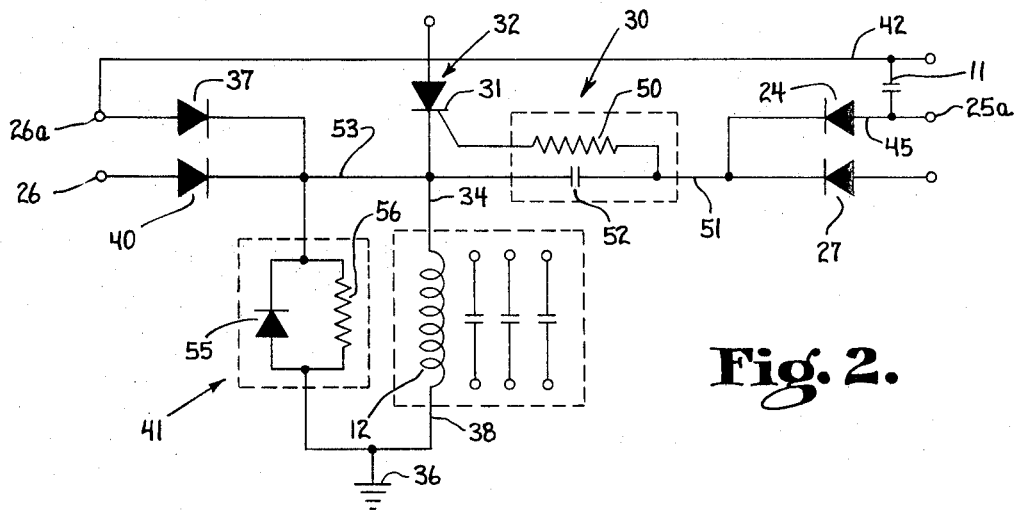
FIG. 2 is a schematic diagram showing in part the circuit of FIG. 1 with additional preferred details thereof and showing it as a part of a toggle flip flop circuit.

Referring now to FIG. 2, a suitable toggle circuit is shown. One of the switches 11 is shown connected across lines 42 and 45, the line 45 being the line connecting the set input terminal 25a and diode 24 and the line 42 being connected to reset terminal 26a. FIG. 2 also shows the details of examples of a suitable gate network 30 and a suitable suppression network 41. Thus, the gate network 30 may include a resistor 50 connected between the gate 31 of the SCR 32 and a line 51 which is connected to the cathodes of the two diodes 24 and 27. The gate network 30 may further include a capacitor 52 connected between the line 51 and the one side of the winding 12. The suppression network 41 may include a diode 55 and a resistor 56 connected in parallel. The diode 55 and resistor 56 are connected between the ground 36 and the line 53 which couples the cathodes of the diodes 37 and 40 to the one side 34 of the winding 12.

Figure 3:
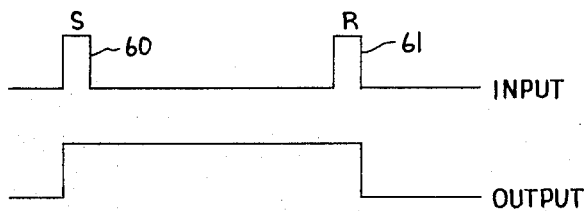
FIG. 3 is a graph showing the input voltage and the output voltage of the circuit of FIGS. 1 and 2.

In order to operate the circuit of FIG. 1 or the circuit of FIG. 2, a set pulse 60 (FIG. 3) is applied to the terminal 25 or 25a. The function of the network 30 is to protect the SCR 32 against substantial gate current yet insuring that the gate 31 gets a good voltage spike sufficient to fire the SCR. The set pulse applied through the diode 27, for example, also places a voltage on the suppression network 41 as well as the winding 12 thus energizing the winding 12. For the purposes of the present preferred embodiment it is assumed that the latch voltage is applied continuously and that the set and reset pulses are between 60 and 100 microseconds in duration and slightly greater in amplitude than the latch voltage. Thus, FIG. 3 shows the set pulse 60 and below the plot of the set pulse shows a representative output voltage which, of course, is provided or is produced by the closing of the contacts at one of the switches 11 and also by the energization of the coil 12.

After the set pulse ceases, the latch voltage remains connected to the winding 12 by reason of the turned on condition of the silicon controlled rectifier 32. The flip flop circuit is now in the set state. In order to place the circuit of FIG. 1 in reset condition, a pulse is applied to the terminal 26. Since the pulse voltage represented at 61 and marked R in FIG. 3 is slightly greater in amplitude than the latch voltage, the SCR 32 is reversed biased thus extinguishing or turning off the SCR. At the end of the reset pulse 61 there is no voltage on the winding 12 so that the cessation of the reset pulse turns off or de-energizes the winding 12 and opens the various contacts 11. The circuit is now in the reset state.

As shown in FIG. 2 the circuit of FIG. 1 can be used as a toggle flip flop by connecting the terminal 26a to the terminal 25a through one of the switches 11. Thus, a pulse applied to the terminal 25a acts to place the circuit of FIG. 2 in a set condition with the contacts of the switches 11 closed including the contacts of the particular switch 11 between the lines 42 and 45. In the set condition the winding 12 is held energized by the latch voltage through the turned on SCR 32. Now, assume a further pulse is applied to the terminal 25a. Because of the closed contacts 11 this pulse or voltage also appears on the line 42, the terminal 26a, the diode 37, the lead 53, and the side 34 of the winding 12. Since the pulse is of slightly greater voltage than the latch voltage, the SCR is extinguished and there is no current flow through the SCR even though a gate voltage is present on the SCR. When the pulse at the terminal 25a ceases, the gate voltage is removed from the SCR simultaneously with the removal of the voltage on the lead 53. Consequently, the SCR remains turned off and the toggle circuit is in reset condition with the winding 12 de-energized and the contacts 11 open.

The function of the suppression network 41 is to attenuate or suppress the inductive kick of the winding 12. By providing an alternate path for current flow when the energizing voltage to the winding 12 is shut off, the suppression network prevents damage to the SCR and also prevents possible false operation of the circuit. Thus, the suppression network tends to prevent the voltage at the one side 34 of the winding from going to an extreme negative value at the end of the reset pulse.

The function of the gate network is to protect the SCR against substantial gate current yet insuring that the gate gets a good voltage spike sufficient to fire the SCR. Considering, for example, the operation of the SCR when voltage is applied to the line 51 and across the circuit to ground, the instantaneous voltage at the cathode of the SCR goes up in similar fashion to that at the gate. However, after the capacitor 52 has charged to an extent, the voltage at the SCR cathode decreases. This operation continues until the constant voltage standing on the gate 31 together with the increasing voltage differential between the anode and cathode of the SCR causes firing of the SCR.

It should be understood that the above described circuit when connected as a toggle flip-flop (FIG. 2) has one unique feature in that it requires a controlled pulse length for proper operation. Thus, if the set pulse has a time duration substantially greater than that necessary to fire the SCR 32, contacts 11 will close and a reset signal will be applied through the line 45 to reset terminal 26a. Thus, the pulse supplied to the terminal 25a to act as a set pulse cannot have too great a time duration. But also the pulse must last for a sufficiently long time in order to fire the SCR or else the circuit will not operate. In some applications the above described operation of requiring a predetermined range of pulse duration may be disadvantageous and, consequently, further circuits are described below which avoid this disadvantage. It can be appreciated, however, that in some applications it is advantageous that the present circuit will operate only by reason of a pulse of a given time duration.

In one specific embodiment of the present invention the components had the following values:

Diode 24 IN463A
Diode 27 IN463A
Diode 37 IN463A
Diode 40 IN463A
Diode 55 IN2069
Silicon Controlled Rectifier 32 2N1595
Resistor 56 1K ohms
Resistor 50 1K ohms
Capacitor 52 .005 microfarad The windings 12 and contacts 11 are a New Product Engineering 24 volt reed relay manufactured by New Product Engineering of Wabash, Ind. The latch voltage on the terminal 35 is 24 volts DC.

As mentioned above, the circuit described above requires a controlled pulse length and in some applications this is a disadvantage. The circuits discloses in FIGS. 4, 6, and 7 will accept any pulse of greater time duration than a predetermined value and provide proper operation. With the components and parameters of the values indicated below, the circuits of FIGS. 4, 6, and 7 will accept any pulse length greater than approximately 60 microseconds. The circuit of FIG. 7 has an advantage over the circuits of FIG. 4 and FIG. 6 when a toggle flip flop is required. As will become evident below, the circuits of FIG. 4 and FIG. 6 require one normally closed contact and one normally open contact for gating whereas the circuit of FIG. 7 requires only one normally open contact.

Figure 4:
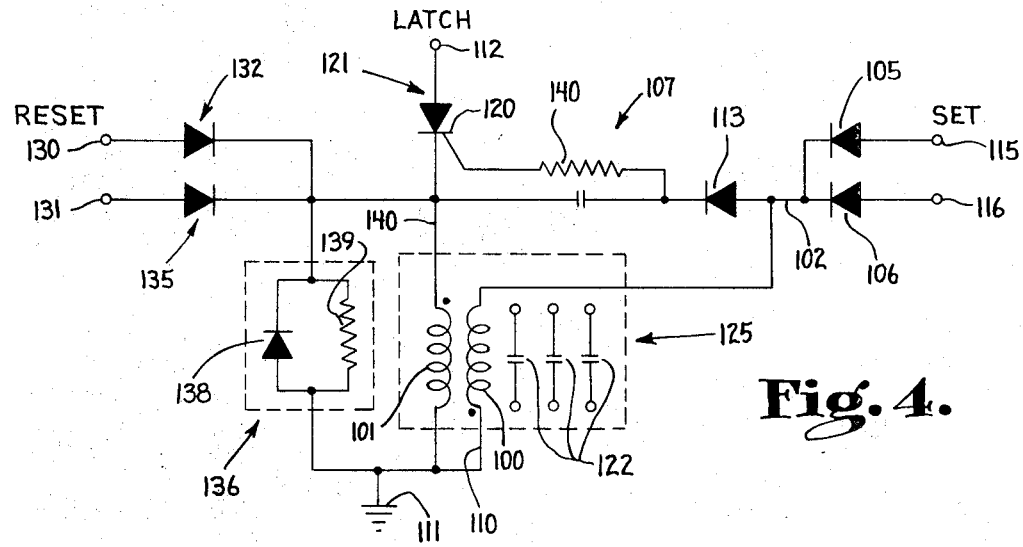
FIG. 4 is a schematic diagram of a circuit forming an alternative embodiment of the present invention.

Referring now more particularly to FIG. 4, there is illustrated a circuit which is identical to the circuit described above in FIG. 1 but with the exception that the circuit of FIG. 4 has an inhibit winding 100 in addition to the winding 101. Thus, the windings 100 and 101 are so arranged that when both are energized they cancel out one another producing virtually no resulting flux. In other words, each of the coils 100 and 101 provide magnetic flux fields of substantially equal strength and opposite polarity with both coils being wound on a bobbin similar to the bobbin illustrated in FIG. 8. The winding 100 is connected between the lead 102 which connects the cathodes of the diodes 105 and 106 to the gate network 107. The opposite end 110 of the winding 100 is connected to ground 111. It will also be noted that an additional diode 113 is connected in series between the set input diodes 105 and 106 and the gate network 107.

The operation of the circuit of FIG. 4 is generally the same as the operation of the circuit of FIG. 1 except as described below. Assume that a latch voltage is applied continuously on the latch terminal 112. Assume further that the pulse voltage applied to either the terminal 115 or the terminal 116 is a slightly greater amplitude than the latch voltage applied to the terminal 112. When the set pulse is applied, current flows through either the diode 105 or 106. Current also flows through the diode 113 and a voltage is applied to the gate 120 of the SCR 121 causing the SCR to fire. Firing of the SCR 121 causes the latch voltage 112 to be placed on the winding 101 thereby energizing that winding. However, because the inhibit winding 100 is connected to the lead 102 the winding 100 is also energized so that the flux in the winding 101 is canceled by the flux in the winding 100. Thus, the contacts 122 of the relay 125 including the winding 100 and 101 do not yet close.

Figure 5:
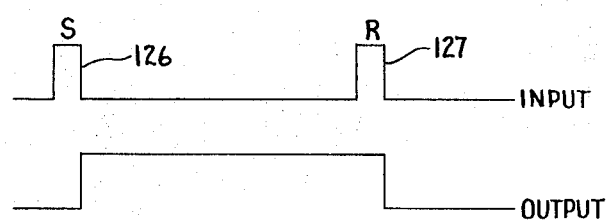
FIG. 5 is a graph showing the input and output voltage of the circuit 4.

Referring to FIG. 5, 126 indicates the set pulse. When the set pulse ceases or ends, the winding 100 is de-energized so that the flux created by the winding 101 causes the contacts 122 to close. The flip flop circuit of FIG. 4 is now in the set state. Assume now that a reset pulse 127 is applied to either the terminal 130 or the terminal 131. The reset pulse causes current to flow through the diode 132 or the diode 135 and also through the winding 101 as well as the suppression network 136. Since the pulse is greater in amplitude than the latch voltage at the terminal 112, the SCR is reversed biased and the SCR current goes to zero thereby turning off the SCR. Thus, at the end of the reset pulse the voltage on the side 140 of the winding 101 goes to zero thereby de-energizing the winding 101 and causing the contacts 122 to be released. As mentioned above, the circuit of FIG. 4 can be used in toggle operation; however, one of the contacts 122 must be a normally closed contact and another of the contacts 122 must be a normally open contact to provide proper gating of pulses to the circuit of FIG. 4. Thus, as the pulses would come in to the circuit of FIG. 4 they would be diverted first to a set terminal and then to a reset terminal.

In one specific embodiment of the circuit of FIG. 4, the components had the following values:

Diode 105 IN463A
Diode 106 IN463A
Diode 113 IN463A
Diode 132 IN463A
Diode 135 IN463A
Diode 138 IN2069
Silicon Controlled Rectifier 121 2N1595
Resistor 139 1K ohms
Resistor 140 1K ohms
Capacitor 141 .005 microfarad The windings 100 and 101 and the contacts 122 may be a New Product Engineering 24 volt reed relay. The latch voltage on the terminal 112 is 24 volts DC.

Figure 6:
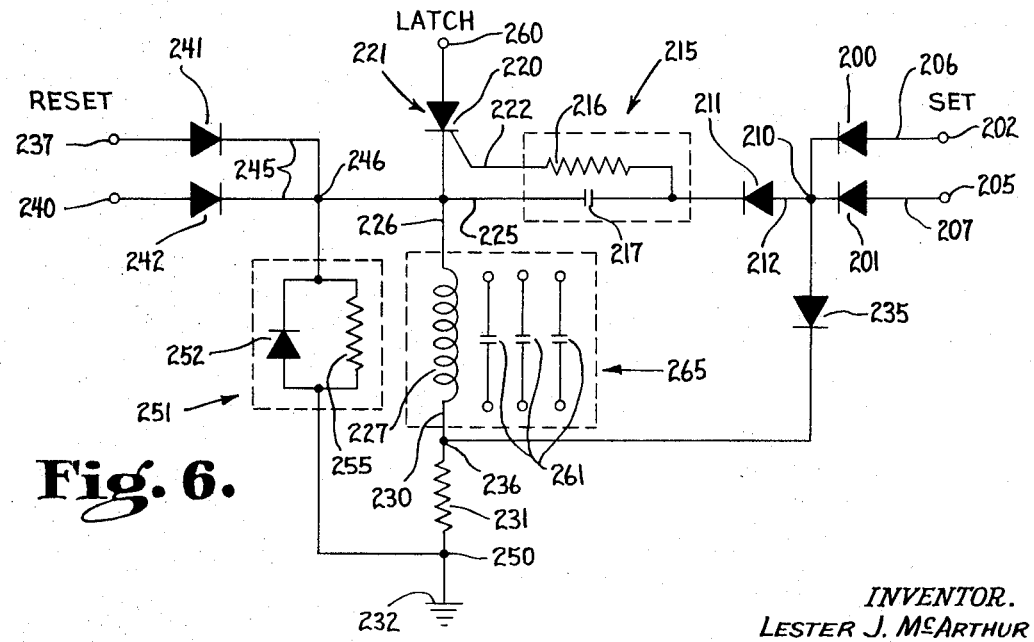
FIG. 6 is a schematic diagram of a circuit forming still another alternative embodiment of the present invention.

Referring now to FIG. 6, a circuit is illustrated which performs the same function as the circuit of FIG. 4 but which does not require a dual wound coil. The circuit of FIG. 6 includes a pair of diodes 200 and 201 which have connected to their respective anodes the terminals 202 and 205 by means of the leads 206 and 207. The cathodes of the diodes 200 and 201 are connected together at junction 210 and a diode 211 is connected to the cathodes 200 and 201 by lead 212. The cathode of the diode 211 is connected to a gate network 215 which similarly to the gate network of FIGS. 1, 2, and 4 includes a resistor 216 and a capacitor 217. The resistor 216 is connected to the gate 220 of the SCR 221 by means of lead 222. The capacitor 217 has one side thereof connected by the lead 225 to the cathode of the SCR 221. Lead 225 also connects the capacitor 217 to the one side or terminal 226 of the winding 227.

The other side 230 of the winding 227 is connected to one side of a resistor 231 which is in turn connected to ground at 232. A diode 235 is connected between the point 210 in a circuit and a point 236 between the winding 227 in the resistor 231. On the reset side of the circuit, there is provided terminals 237 and 240 which are connected to the diodes 241 and 242, respectively. Leads 245 connect the cathodes of the diodes 241 and 242 together at junction 246. Connected between the junction 246 and a junction 250 is a suppression network 251 which consists of a parallel connection of the diode 252 and the resistor 255.

Considering now the operation of FIG. 6, the set pulse applied to either terminal 202 or 205 comes in through the diodes 200 or 201 to the junction 210. The set pulse causes a rapidly increasing voltage to be applied to the SCR 221 through the gate network 215 causing firing of the SCR 221 and causing the voltage standing on the latch terminal 260 to be applied at terminal 226. Until the set pulse is terminated, however, there is no voltage drop across the winding 227 because the diode 235 is connected between the junction 210 and the junction 236 and therefore keeps the voltage at 236 at the same approximate value as the voltage at the junction 210. Of course, when the set pulse terminates, the voltage supplied through the diode 235 is no longer present and there is a voltage drop across the winding 227 causing energization thereof and causing operation of the contacts 261. When a reset pulse is applied to either the terminal 237 or the terminal 240 current is supplied through either of the diodes 241 or 242 to the junction 246. The current from the junction 246 flows through the suppression network 251 as well as the winding 227 and the resistor 231 to ground at 232. The voltage provided at the point 246 is greater than the latch voltage and therefore the SCR 241 is extinguished. The turning off of the SCR 221 does not, however, release the relay because the voltage from the reset pulse maintains the winding 227 energized until the end of the reset pulse at which time the winding 227 is de-energized and the contacts 261 are released. Similarly to the above described circuit of FIG. 4, the circuit of FIG. 6 requires a normally open contact and a normally closed contact included within the relay 265 in order to make possible a toggle type operation. It should also be mentioned that the circuit of FIG. 6 cannot have its SCR 221 turned on without a current path through the suppression network 251.

In one specific embodiment of the above circuit of FIG. 6, the components and parameters might have the following values:

Diode 200 IN463A
Diode 201 IN463A
Diode 211 IN463A
Diode 241 IN463A
Diode 242 IN463A
Diode 235 IN2069
Resistor 216 1K ohms
Capacitor 217 .005 microfarad
SCR 221 2N1595
Diode 252 IN2069
Resistor 255 1K ohm
Resistor 231 560 ohms The relay 265 is a New Product Engineering 822 series 12 volt relay. The voltage applied to the latch 260 is 24 volts DC.

Figure 7:
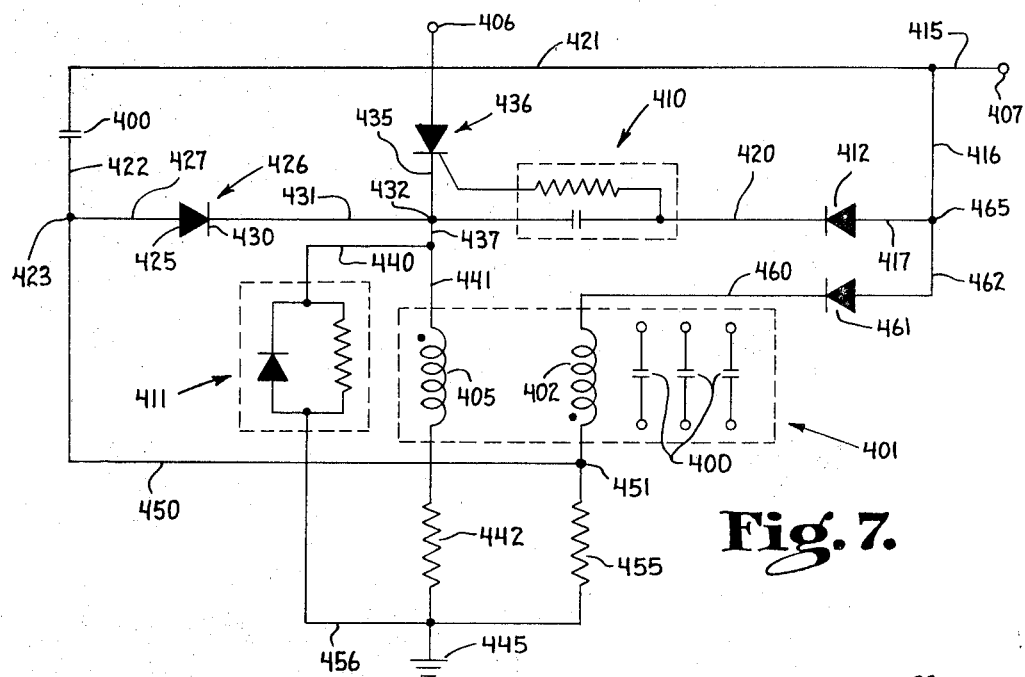
FIG. 7 is a schematic diagram of still a further alternative embodiment electrical circuit of the present invention.

Referring now more particularly to FIG. 7 there is illustrated a toggle flip flop circuit which includes concepts presented in the various preceding circuits. The toggle flip flop circuit of FIG. 7, however, does not require a normally closed contact as does the circuit of FIG. 4 and the circuit of FIG. 6 but instead requires only one normally open contact of the contacts 400 forming a part of the relay 401. The relay 401 includes an inhibit winding 402 in addition to winding 405. The terminal 406 has a latch voltage standing thereon while the terminal 407 is the input for the set and reset pulses. The circuit of FIG. 7 is similar to the various above described circuits in that it requires a gate network 410 and a suppression network 411. There is also provided a diode 412 controlling flow of current from the terminal 407 through lead 415, lead 416 and lead 417, diode 412, through lead 420 into the gate network 410.

The circuit of FIG. 7 also includes a lead 421 which is connected to one side of the contacts 400 the other side of which is connected through the lead 422 and junction 423 to the anode 425 of a diode 426 by means of lead 427. The cathode 430 of the diode 426 is connected by means of lead 431 to the junction 432. The lead 435 connects the junction 432 to the cathodes of the SCR 436. The leads 437 and 440 connect the suppression network 411 to the junction 432. The leads 437 and 441 connect the one side of the winding 405 to the junction 432 while the other side of the winding 405 is connected through the resistor 442 to ground at 445.

A lead 450 is connected between the junction 423 and a junction 451 located between a resistor 455 and the inhibit winding 402 of the relay 401. The suppression network 411 has one side thereof connected by means of means of lead 456 to the resistor 455. The inhibit winding 402 is connected by a lead 460 to a diode 461 which has its other side connected through lead 462 to the junction 465 between the diode 412 and the input terminal 407.

The operation of the circuit of FIG. 7 is as follows. A pulse is applied to the terminal 407 causing the SCR 436 to be turned on thus applying the latch voltage to the winding 405. The set pulse simultaneously energizes the winding 402. When the set pulse terminates only the winding 405 remains energized from the latch terminal 406. Thus, the contacts 400 are operated including the contacts 400 connected between the leads 421 and 422. When a reset pulse is applied to the terminal 407 the SCR 436 is turned off because of the voltage at 432 which is greater than the latch voltage. This pulse does not, however, energize the winding 402 because both terminals of the winding are at the same potential by reason of the lead 450. The reset pulse does, however, maintain the winding 405 energized until the end of the reset pulse at which time the winding 405 becomes de-energized and the contacts 400 are relesed causing the circuit to move to the reset condition. Of course, application of a further pulse causes a repeat of the operation moving the circuit back to the set condition.

In one specific embodiment of the circuit of FIG. 7, the components and parameters had the following values:

Diode 412 IN463A
Diode 461 IN463A
Diode 425 IN463A
SCR 436 2N1595
Diode in circuit 411 IN2069
Resistor in circuit 411 1K ohm
Resistor in circuit 410 1K ohm
Capacitor in circuit 410 .005 microfarad
Resistor 442 560 ohms
Resistor 455 560 ohms The relay 401 is a NPE 12 volt. The latch voltage at 406 is 24 volts.

It will be evident from the above description that the present invention provides an improved control module and an improved flip flop circuit. It will also be evident that the module of the present invention is of simple construction and economical to manufacture. It can further be evident that the module of the present invention has comparatively high operating speeds and is capable of handling comparatively large amounts of power.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:
1. A control module comprising:
   first contact means operable between first and second positions;
   a winding means providing a magnetic field for operating said first contact means;
   a controlled rectifier having its cathode connected to said winding means and having a gate and an anode;
   a latch input circuit connected to the anode of said controlled rectifier for energizing said winding means through said controlled rectifier;
   a set input circuit connected to the gate of said controlled rectifier for turning on said controlled rectifier;
   a reset input circuit connected to said cathode for extinguishing said controlled rectifier;
   a source of reference potential;
   said latch input circuit, said set input circuit and said reset input circuit are connected to said source of reference potential through said winding means;

said set input circuit including a gate network, said reset input circuit being connected between said winding means and said cathode;

a suppression network connected across said winding means;

a gate network comprising: a resistor connected at one end to said rectifier gate and, a capacitor connected at one end to said winding between said rectifier cathode and said winding, said resistor and said capacitor being connected at their other ends to one another for receiving a set pulse.

2. A control module comprising:

first contact means operable between first and second positions;

a winding means providing a magnetic field for operating said first contact means;

a controlled rectifier having its cathode connected to said winding means and having a gate and an anode;

a latch input circuit connected to the anode of said controlled rectifier for energizing said winding means through said controlled rectifier;

a set input circuit connected to the gate of said controlled rectifier for turning on said controlled rectifier;

a reset input circuit connected to said cathode for extinguishing said controlled rectifier;

said reset input circuit being connected to said set input circuit by means of said contact means for toggle operation.

3. A control module comprising:

first contact means operable between first and second positions;

a winding means providing a magnetic field for operating said first contact means;

a controlled rectifier having its cathode connected to said winding means and having a gate and an anode;

a latch input circuit connected to the anode of said controlled rectifier for energizing said winding means through said controlled rectifier;

a set input circuit connected to the gate of said controlled rectifier for turning on said controlled rectifier;

a reset input circuit connected to said cathode for extinguishing said controlled rectifier;

a source of reference potential;

said latch input circuit, said set input circuit and said reset input circuit are connected to said source of reference potential through said winding means;

said set input circuit including a gate network comprising a resistor connected at one end to said rectifier gate and, a capacitor connected at one end to said winding between said rectifier cathode and said winding;

said resistor and said capacitor being connected at their other ends to one another for receiving a set pulse;

said set input circuit including a pair of rectifiers having output sides connected to one another for isolating one set input from another;

an inhibit winding arranged when energized to cancel out the flux of said winding means, said inhibit winding being connected between said source of reference potential and the output sides of said rectifiers in said set input circuit;

a diode connected between said gate network and the output sides of said rectifiers in said set input circuit and arranged to block flow from said latch input circuit through the activated controlled rectifier and said reset input circuit to said inhibit winding but to permit flow from said set input circuit to said winding means and said inhibit winding.

4. A control module comprising:

first contact means operable between first and second positions;

a winding means providing a magnetic field for operating said first contact means;

a controlled rectifier having its cathode connected to said winding means and having a gate and an anode;

a latch input circuit connected to the anode of said controlled rectifier for energizing said winding means through said controlled rectifier;

a set input circuit connected to the gate of said controlled rectifier for turning on said controlled rectifier;

a reset input circuit connected to said cathode for extinguishing said controlled rectifier;

a source of reference potential;

said latch input circuit, said set input circuit and said reset input circuit are connected to said source of reference potential through said winding means;

said set input circuit including a gate network comprising a resistor connected at one end to said rectifier gate and, a capacitor connected at one end to said winding between said rectifier cathode and said winding;

said resistor and said capacitor being connected at their other ends to one another for receiving a set pulse;

said set input circuit including a pair of rectifiers having output sides connected to one another for isolating one set input from another;

a first diode connected between said gate network and the output sides of said rectifier in said set input circuit and arranged to block flow from said latch input circuit through the activated controlled rectifier and said reset input circuit to said rectifiers in said input circuit, but to permit flow from said set input circuit to said winding means;

a resistor connected between said winding and said source of reference potential, a further diode connected from the set input side of said first diode to the junction of said resistor and said winding so that current flow in said winding is prevented during a set pulse;

and a suppression network connected across said winding means and said resistor.

References Cited

UNITED STATES PATENTS

| | | | |
|---|---|---|---|
| 3,265,991 | 1/1964 | Ferguson | 331—111 |
| 3,331,992 | 7/1967 | Walker | 317—148.5 |
| 3,193,733 | 7/1965 | Orsino | 317—148.5 |
| 3,147,419 | 9/1964 | Cope | 318—129 |
| 3,174,062 | 3/1965 | Laishley | 307—218 |

J D MILLER, Primary Examiner

C. L. YATES, Assistant Examiner

U.S. Cl. X.R.

317—141